United States Patent [19]

Steiner

[11] 4,058,645
[45] Nov. 15, 1977

[54] HEAT SEALABLE THERMOPLASTIC FILMS

[75] Inventor: Robert Henry Steiner, Rochester, N.Y.

[73] Assignee: Mobil Oil Corporation, New York, N.Y.

[21] Appl. No.: 671,473

[22] Filed: Mar. 29, 1976

Related U.S. Application Data

[63] Continuation of Ser. No. 391,177, Aug. 24, 1973, abandoned.

[51] Int. Cl.² .................... B32B 5/16; B32B 27/08
[52] U.S. Cl. ................................. 428/331; 428/349; 428/520
[58] Field of Search ............... 428/331, 484, 397–399, 428/497, 409, 515, 516, 520, 522, 523, 913; 260/28.5 R

[56] References Cited

U.S. PATENT DOCUMENTS

| | | | |
|---|---|---|---|
| 2,430,934 | 11/1947 | Kemmler et al. | 428/497 X |
| 3,355,319 | 11/1967 | Rees | 428/497 X |
| 3,458,392 | 7/1969 | Kremer et al. | 428/497 |
| 3,533,878 | 10/1970 | Aulik et al. | 428/497 X |
| 3,753,769 | 8/1973 | Steiner | 428/331 |
| 3,944,695 | 3/1976 | Kosaka et al. | 428/497 |

Primary Examiner—William J. Van Balen
Assistant Examiner—A. S. Thomas
Attorney, Agent, or Firm—Charles A. Huggett; James D. Tierney

[57] ABSTRACT

A coating composition to improve the physical characteristics of thermoplastic films, such as oriented polypropylene, comprising (1) an acrylic terpolymer of methyl methacrylate, methyl acrylate, and methacrylic acid; and (2) an aqueous-alkali soluble rosin, comprising an adduct of rosin with an alpha-beta unsaturated dicarboxylic acid esterified with a polyhydric alcohol.

5 Claims, No Drawings

HEAT SEALABLE THERMOPLASTIC FILMS

CROSS REFERENCE TO RELATED APPLICATIONS

This application is a continuation of U.S. Ser. No. 391,177, filed Aug. 24, 1973, now abandoned.

BACKGROUND OF THE INVENTION

1. Field of the Invention

The present invention relates to coating compositions adapted for application to film substrate materials such as plastic films, for example polyolefin films. Such films include polyethylene, polypropylene, polybutene and the like including mixtures thereof, whereby certain properties of such films are improved. Specifically, uncoated, oriented films such as polypropylene have very high heat-sealing temperatures and an extremely narrow heat sealing range, and especially in the case of uncoated, oriented polypropylene, they exhibit a tendency to disorient and shrink when the prequisite sealing temperatures are applied to the surface thereof. Further, when coating materials are applied to the film to remedy the above deficiencies, although such coatings improve the heat seal characteristics of the coated film, it has been found that when packages are wrapped and sealed with such film, and exposed to a high humidity environment, the strength of the sealed area is greatly reduced or may fail completely. The coating compositions of the present invention, when applied to a substrate film such as oriented polypropylene, for example, not only lower the heat-seal temperatures of such film and increase the heat seal range of such coated films, but also greatly improve the high humidity resistance of such films after they have been sealed together. Additionally, the present coating compositions impart increased stiffness or "handle" properties of the film, good hotslip characteristics, and facilitate the formation of peelable heat seals which permits opening of a package overwrapped with the coated film material of this invention without tearing or destroying the wrapper.

2. Description of the Prior Art

Attempts have been made to produce coatings for thermoplastic film substrates employing various hydrocarbon resins and mixtures of resins and the like to provide, for example, improved heat seal properties, but in many instances such polymeric coatings have had deleterious effects on the coated film product. Such defects include poor blocking characteristics, poor optical properties, poor heat sealability and aging characteristics. Further, certain resin coating compositions of the prior art exhibit poor resistance to exposure or storage at high relative humidity which results in seal deterioration or complete failure of the sealed film under even moderate stresses.

DESCRIPTION OF SPECIFIC EMBODIMENTS

In accordance with the present invention, resinous compositions are provided which may be employed in coating polyolefin substrates, such as oriented polypropylene, for example, to improve the heat-seal characteristics of such films and additionally the film's resistance to seal failure when exposed to a high relative humidity environment on the order of 90% or more. In addition, the coated films of the present invention have high heat seal strengths over a wide sealing temperature range, excellent slip properties both at ordinary or ambient temperatures and in contact with hot sealing platens, high resistance to blocking during storage and usage and excellent clarity and gloss characteristics.

The coating formulation of the present invention comprises a mixture of (1) a resinous interpolymer consisting essentially of (a) from about 2 to about 15 parts, and preferbly from about 2.5 to about 6 parts by weight of a $\alpha$-$\beta$ monoethylenically unsaturated carboxylic acid selected from the group consisting of acrylic acid methacrylic acid, and mixtures thereof, and (b) from about 85 to about 98 preferably from about 94 to about 97.5 parts by weight of neutral monomer esters preferably comprising methyl acrylate or ethyl acrylate and methyl methacrylate; in admixture with from about 2 to about 15% parts by weight of an aqueous-alkali soluble rosin derivative. The rson derivative is an adduct of rosin with an $\alpha$-$\beta$ unsaturated dicarboxylic acid, the adduct subsequently being partialy esterified with a polyhydric alcohol. The rosin used is wood or gum rosin, but refined or modified products may be used such as abietic acid, isomerized rosin or polymerized rosin. The rosin may also be diluted with a saturated linear dicarboxylic acid such as succinic, glutanic, adipic, pimelic, suberic, azelaic, sebacic and the like.

The $\alpha$-$\beta$ unsaturated acid which may be used to form the adduct with rosin include fumaric acid, maleic acid, maleic anhydride, itaconic acid, citraconic acid and the like.

The rosin adduct, with or without saturated dicarboxylic acids is partially esterified with a dihydric or trihydric alcohol such as ethylene glycol, propylene glycol, butylene glycol, diethylene glycol, triethylene glycol, glycerol and the like. The resultant rosin adduct should have an acid number of at least about 35 so that it can be dissolved in aqueous alkaline solution.

The amount of rosin added to the acrylic multipolymer resin, hereinbefore described, is desirably held to the minimum required to achieve the desired result of reducing the sensitivity of resultant heat seals to conditions of high humidity. In general, from about 3% to about 15% of the rosin adduct, based upon the total weight of acrylic terpolymer, may be employed and preferably from about 4% up to about 10%. Higher amounts of rosin adduct, i.e. above about 15%, result in undesirably high minimum heat seal temperatures.

The coating compositions of the present invention, when applied to a suitable substrate film such as oriented polypropylene, for example, give coatings which possess hitherto unavailable properties such as improved resistance of heat seals to conditions of high relative himidity on the order of about 90% and above. Additionally, the present film coatings improve the heat seal properties, blocking characteristics, hot-slip properties, stiffness, and optical properties of the final coated film product.

The coating resins of the present invention when applied to the surface of a film substrate exhibit rather high temperature softening points, i.e. on the order of about 170° F. and above. Accordingly, when the coated films in roll form are stored over prolonged periods of time, it has been found that under normal film storage conditions the overlying film layers exhibit little or no tendency to block due to softening of the coating. This has been a particularly troublesome problem with many prior art resinous coatings for thermoplastic films and has now been eliminated by employment of the novel coating compositions of the present invention.

The present invention embodies a thermoplastic article, and particularly a polyolefin film such as polyethylene or polypropylene substrate, which is coated on at least one surface thereof with a thin heat sealable polymer film. The film is preferably initially pretreated to promote good adhesion of the applied polymeric coating. The treated film is then coated on at least one side with a multi-polymer and rosin adduct composition, preferably together with one or more other materials and including a finely divided inorganic material.

In order for a coating resin to meet necessary commercial requirements such as, for example, being heat sealable at as low a temperature as possible while exhibiting non-blocking characteristics at storage conditions which may be as high as 125° F., it has been found that the glass transition temperature (Tg) of the resin coating should be in the range of from about 100° to about 140° F. The Tg may be defined as the temperature at which a polymer changes from a glassy, brittle solid to a very high viscosity liquid [Bueche, "Physical Properties of Polymers", Interscience Publishers, 1962]. At temperatures below or for that matter even slightly above the Tg, polymers exhibit such greater resistance to viscous flow that sealing does not take place, irregardless of applied pressures or how long the polymer surfaces are left in contact with each other.

Another requirement of a coating resin which is to be applied by "wet" techniques, as contrasted to hot melt techniques, is that it be soluble or dispersible in volatile solvents to produce low viscosity, high solids content solutions or dispersions. For obvious commercial reasons, the solvent should be readily available and inexpensive, with water representing the ultimate goal. Many coatings are applied as dispersions of polymers in water, commonly called latices. However, the application of coatings from the latex form has several disadvantages. First, even the finest latex particles are massive in comparison to the ultimate molecular size, containing many millions of resin molecules. This prevents the intimate blending of compounding ingredients which may be desired in order to achieve certain properties. Second, most latices contain very large amounts of surface active agents in order to maintain particle dispersion. Those surfactants can be detrimental to the desired properties of the coating material such as adhesion, optical clarity, etc. On the other hand, truly water soluble polymers such as polyvinyl alcohol are not desirable as coatings because of their tendency to absorb moisture from the air at conditions of high relative humidity and become sticky. It is known that polymers containing pendant carboxylic acid groupings are soluble in water containing sufficient amounts of a base such as ammonia to neutralize the acid. The amount of acid required in a polymer for ammonia water solubility is dependent upon the nature of the other monomer units, but generally is in the range of from about 2 to about 15% by weight. A coating of a resin of this type applied from ammonia water solution becomes water insoluble on drying because of volatilization of the solubilizing ammonia.

Finally, a heat sealable coating resin should have a sufficiently low molecular weight in order to exhibit sufficient viscous flow at temperatures moderately above the Tg to give a good seal. Also, low molecular weight is desirable to result in ammonia water solutions of low viscosity.

In accordance with one aspect of the present invention, it has been found that the aforediscussed desirable properties of a heat sealable coating resin may be achieved by controlled synthesis of the multipolymers of the present invention.

the novel multipolymers possessing the desired properties of Tg, acid content, and molecular weight may be produced in accord with the present invention by the proper selection and interpolymerization of the following types of compounds, in the presence of a suitable chain transfer agent such as, for example, mercaptans or halogenated hydrocarbons:

A. A high Tg monomer;
B. A low Tg monomer; and
C. Acid containing monomers.

Examples of high Tg monomers which may be employed include ethyl methacrylate, methyl methacrylate and others.

Examples of low Tg monomers which may be employed include, for example, lower alkyl acrylates such as methyl, ethyl or butyl acrylates.

Examples of acid monomers which may be employed include, for example, acrylic acid, methacrylic acid, maleic acid, crotonic acid and mixtures thereof.

Examples and properties of the multipolymer composition portion of the novel coating mixtures of the present invention are disclosed in applicant's U.S. Pat. No. 3,753,769, the disclosure of said patent being incorporated herein by reference.

The polymerization reaction may be advantageously carried out by adding the mixed monomers incrementally during the reaction in order to attain a more nearly homogeneous distribution of monomers in the multipolymer molecules.

The relative proportions of monomers which may be employed to produce the novel multipolymer coating compositions of the present invention may vary and include between about 2% and about 15%, and preferably from about 2½% to about 6% of an α-β unsaturated carboxylic acid or mixtures thereof, and from about 85% to about 98%, and preferably from about 94% to about 97.5% by weight of the neutral ester monomers, said monomers having been interpolymerized utilizing known polymerization techniques, such as, for example, emulsion polymerization.

Thus, the present invention embodies, for example, terpolymers that may be prepared by terpolymerizing ethylenically unsaturated monomers including between 2% and 15% by weight, and preferably from about 2½% to about 6% by weight, of an α-β unsaturated carboxylic acid and preferably acrylic or methacrylic acid and mixtures thereof; 85% to 98%, and preferably about 94% to 97.5% by weight of neutral monomer esters comprising (a) an alkyl acrylate ester such as methyl, ethyl or butyl acrylate and (b) alkyl methacrylate esters such as methyl methacrylate or ethyl methacrylate, for example. The monomer components are employed in a ratio such that the alkyl methacrylate monomer is present in an amount of at least 10% by weight of the total terpolymer composition and preferably from about 20 to about 80% by weight, and the alkyl acrylate monomer component in amounts of at least 10% by weight of the total coating composition, and preferably from about 80 to about 20% by weight.

The rosin adduct, hereinbefore described, portion of the coating compositions of the present invention may vary broadly in composition; however, a particularly suitable adduct has been found to be a wood-rosin-fumaric acid adduct, partially esterified with ethylene glycol and having a ring and ball melting point of 144°

C. and an acid number of 135. This particular rosin adduct was employed in the following example.

In general, the uncoated substrate films employed in the practice of the present invention are usually from 0.2 to up to 5 mils in thickness and preferably from about 0.5 to 1.5 mils.

Before applying the coating composition to the appropriate substrate, the surface of the substrate film is treated to ensure that the coating will be strongly adherent to the film thereby eliminating the possibility of the coating peeling or being stripped from the film. This treatment may be accomplished by employing known prior art techniques such as, for example, film chlorination, i.e. exposure of the film to gaseous chlorine, treatment with oxidizing agents such as chromic acid, hot air or steam treatment, flame treatment and the like. Although any of these techniques may be effectively employed to pretreat the film surface, a particularly desirable method of treatment has been found to be the so-called electronic treatment method which comprises exposing the film surface to a high voltage corona discharge while passing the film between a pair of spaced electrodes. After electronic treatment of the substrate film surface, it may be coated with the coating composition of the present invention which coating will then exhibit a tendency to more strongly adhere to the treated film surface.

In applications where even greater coating-to-film adherence is desired, i.e. greater than that resulting from treatment of the film surface by any of the aforediscussed methods, an intermediate primer coating may be employed to increase the adherence of the coating composition of the present invention to the substrate film. In that case the film is first treated by one of the foregoing methods, electronic treatment being a preferred method to provide increased active adhesive sites thereon (thereby promoting primer adhesion) and to the thus treated film surface there is subsequently applied a continuous coating of a primer material. Such primer materials are well known in the prior art and, for example, include alkyl titanates and poly (ethylene imine). A particularly effective primer coating for purposes of the present invention has been found to be poly (ethylene imine). The imine primer provides an overall adhesively active surface for thorough and secure bonding with the subsequently applied coating composition of this invention. The primer is applied to the electronically treated base film by conventional solution coating means such as mating roller application, for example. It has been found that an effective coating solution concentration of the poly (ethylene imine) applied from either aqueous or organic solvent media such as ethanol, for example, in a solution comprising about 0.5% by weight of the poly (ethylene imine).

It is possible to add the coating compositions of the present invention onto the surface of the treated film substrate from a non-aqueous solution of the composition using, for example, various organic solvents such as alcohols, ketones, esters, etc. However, since the coating compositions of the present invention may, as stated hereinafter, contain colloidal inorganic materials and since such materials are difficult to keep well dispersed in organic solvents, it is preferable that the coating compositions of the present invention be applied from aqueous media and preferably from an alkaline aqueous solution thereof.

The solution of terpolymer and rosin adduct, preferably in an alkaline aqueous solution such as an ammoniacal solution, is applied to the treated surface of a film material in any convenient and known manner, such as by gravure coating, roll coating, dipping, spraying etc. The excess aqueous solution may be removed by squeeze rolls, doctor knives, etc. That coating composition should be applied in such amount that there will be deposited upon drying, a smooth evenly distributed layer of from 0.02 to 0.04 mil thickness which, expressed otherwise, is equivalent to about 0.4 to 0.8 grams per 1,000 sq. in. of film per side of the film being coated. In general, the thickness of applied coating is such that it is sufficient to impart the desired heat sealability and stiffness characteristics to the base film structure.

The coating on the film, as exemplified by use of an ammoniacal solution of the terpolymer and rosin adduct, is subsequently dried by hot air, radiant heat or by any other convenient means. Upon drying, ammonia is evolved leaving a non-water soluble, clear, adherent, glossy coated film useful, for example, as a packaging film.

It is also an embodiment in the practice of this invention to incorporate a suitable component to the coating composition to impart "hot slip", that is, satisfactory slip properties when the wrapping material or partially wrapped package passes in contact with the heat sealing portions of wrapping apparatus such as heat platens, etc. It is usually defined quantitatively as the coefficient of friction at the temperature and pressure used.

In order to produce a coated wrapping material having the above characteristics, there is applied to the film a composition made up of the terpolymer and rosin adduct components as hereinbefore described as the film forming and heat sealing agent, together with a solid, finely divided, water insoluble, inorganic material such as colloidal silica, to function as a hot slip agent. Other finely divided inorganic materials which can be used to enhance hot slip properties include such water insoluble solids as diatomaceous earth, calcium silicate, bentonite, and finely divided clays. In order to function most efficiently, it is desirable that this finely divided inorganic material have a particle size between 10 and 200 millimicrons, an alkali stabilized silica dispersion being the preferred material for use.

While the amounts of each material required for producing the optimum hot slip properties may vary depending on the specific material used, the coating compositions, and other variables of composition and process, it is preferred to use from 30 to 60% by weight (based on the terpolymer-rosin adduct) of the slip agent and preferably from about 35% to about 45% by weight.

"Blocking" is the tendency of film to adhere to itself when two or more surfaces of the film are held pressed together, for example, when sheets or mill rolls of the film are stacked in storage. It is more pronounced at elevated temperatures and high relative humidities. Under normal storage conditions, the maximum temperatures encountered will be between 110° and 125° F. and the relative humidity may run as high as 90-100%. It is desirable that under these conditions the coated film will not stick to itself, or, in other words, that it be resistant to blocking. Otherwise, when the film is stored in rolled form on cores, for example, the layers will stick together and the film cannot readily be unwound for use.

Anti-blocking materials which may be used include finely divded waxes and wax-like materials which melt at temperatures above the maximum temperatures encountered in the storage of the film and are not soluble in the terpolymer at these temperatures. Specific examples are natural waxes such as paraffin wax, micro-crystalline wax, beeswax, carnauba wax, japan wax, montan wax, etc., and synthetic waxes such as hydrogenated caster oil, chlorinated hydrocarbon waxes, long chain fatty acid amides, etc.

In addition to functioning as anti-blocking materials the above-described wax materials when incorporated into the coating compositions of the present invention also function to improve the "cold-slip" properties of the films coated therewith, i.e. the ability of a film to satisfactorily slide across surfaces at about room temperatures.

A particular type of thermoplastic film which can be advantageously coated with the coating compositions of this invention is molecularly oriented, isotactic polypropylene. After extrusion of the base polypropylene film utilizing conventional extrusion techniques the film is heated and molecularly oriented by stretching it in both a longitudinal and transverse direction. The resultant oriented film exhibits greatly improved tensile and stiffness properties. However, it is difficult to heat seal by conventional techniques because at the requisite sealing temperature, i.e. on the order of about 350° F., film disorientation and shrinkage occur which results in the film rupturing and tearing apart. However, when such oriented films are subjected to surface treatment methods as hereinbefore described and subsequently coated with the present novel coating compositions, they can then be sealed at temperatures sufficiently low to prevent shrinkage of the substrate, i.e. the oriented polypropylene film.

As hereinbefore noted, standard polymerization techniques may be employed to produce the terpolymer coating compositions of the present invention such as, for example, solution, bulk or emulsion polymerization. However, the preferred polymerization technique for purposes of the present invention and as set forth in the following Example is an emulsion polymerization system.

EXAMPLE I

A reaction vessel was charged with 1.2 liters of water containing 3.0 grams of a commercially available emulsifier identified as Gafac RE-610, a mixture of phosphoric acid esters; and 1.8 grams of ammonium persulfate as a polymerization catalyst. The reaction vessel was then heated to a temperature of approximately 80° C. with stirring. The following materials were mixed and added incrementally with stirring over a period of 3 hours.

a. 216 grams of methyl methacrylate
b. 366 grams of methyl acrylate
c. 18 grams of methacrylic acid and
d. 2.2 grams of ethyl mercaptoacetate as a molecular weight regulator.

Following completion of the monomer addition, the reaction vessel was maintained at the reaction temperature of 80° C. for an additional 30 minutes. Upon termination of the reaction the product contained in the reactor consisted of a latex comprising 33% solids, i.e. 1 part terpolymer resin to two parts water. While still at a temperature of 80° C. the latex reaction product was diluted with 1.2 liters of water containing dissolved therein 21.2 grams of ammonia. The mixture was stirred for 1 hour at 60° to 70° C. and then allowed to cool to room temperature. The product was an ammoniacal aqueous solution of a methyl methacrylate/methyl acrylate/methacrylic acid terpolymer with a viscosity of 20 cps (at 25° C.) and containing 20% terpolymer resin and 600% of the theoretical amount of ammonia required to neutralize the acid groups of the terpolymer. The dried polymer had an intrinsic viscosity of 0.28 and an acid number of 20.

To the ammoniacal aqueous solution of terpolymer was added (a) 40 parts (per 100 parts of terpolymer resin) of an aqueous dispersion (30% solids) of an alkaline stabilized colloidal silica, identified by the tradename Syton; and (b) 10 parts (per 100 parts of terpolymer resin) of an aqueous dispersion (11% solids) of Carnauba wax, resulting in a dispersion of wax and silica in the aqueous ammoniacal solution of the terpolymer composition.

In addition to the aforedescribed silica and wax components of the coating, there was added an adduct of rosin-fumaric acid, which was partially esterified with ethylene glycol. The rosin adduct had a ring-and-ball melting point of 144° C. and an acid number of 135. It was used as 15% solids solution in ammoniacal order.

In the following Table I, varying percentages of rosin adduct are employed with the acrylic terpolymer in Example numbers 1-13 inclusive. Additionally, the percent of silica and carnauba wax are varied to show effects of such variance on the heat-seal blocking, and hot slip properties of the coated film.

TABLE I

| Example No. | Resin % Acrylic | Resin % Rosin | Colloidal Silica(phr) | Carnauba Wax (phr) | Heat Seal Data M.S.T. (° F.) | Heat Seal Data U.S.S. (270° F.) (gms/in) | Humidity Resistance (% Retained) | Blocking | Hot Slip |
|---|---|---|---|---|---|---|---|---|---|
| 1. | 100 | 0 | 40 | 10 | 205 | 305 | 10% | 2.8 | 0.47 |
| 2. | 98 | 2 | 40 | 8 | 208 | 335 | 45 | 2.7 | 0.48 |
| 3. | 96 | 4 | 40 | 6 | 209 | 290 | 90 | 3.4 | 0.45 |
| 4. | 92 | 8 | 40 | 5 | 215 | 255 | 100 | 2.7 | 0.49 |
| 5. | 88 | 12 | 40 | 5 | 218 | 275 | 100 | 2.5 | 0.52 |
| 6. | 80 | 20 | 40 | 5 | 235 | 220 | 100 | 1.6 | 0.54 |
| 7. | 65 | 35 | 40 | 5 | 245 | 210 | 100 | 1.9 | 0.56 |
| 8. | 96 | 4 | 0 | 6 | 198 | 360 | 70 | 5.6 | 1.23 |
| 9. | 92 | 8 | 0 | 5 | 200 | 305 | 100 | 3.0 | 1.31 |
| 10. | 88 | 12 | 0 | 5 | 203 | 280 | 91 | 3.0 | 1.29 |
| 11. | 80 | 20 | 0 | 5 | 212 | 325 | 83 | 2.0 | 1.25 |
| 12. | 65 | 35 | 0 | 5 | 212 | 240 | 100 | 2.1 | 1.19 |
| 13. | 100 | 0 | 40 | 0 | 190 | 200 | 0 | 300 | 0.85 |

DESCRIPTION OF TEST METHODS EMPLOYED

Heat Seal Strength

Heat seals were prepared by placing two film samples, 1 inch wide by 8 inches long, coating to coating, in an E.S.M. Heat Sealer and sealing at various jaw temperatures from 200° to 280° F. under a pressure of 5 psi. with 2 seconds dwell time. The sealed strip is then separated by peeling in a suitable testing machine such as the Suter Tester. The strength, expressed in grams per inch of width, is the maximum pull required to peel the two layers apart.

Minimum Seal Strength (MST)

The MST is the lowest sealing temperature at which a peel strength of at least 100 grams/inch is obtained. Practical experience has shown that films capable of satisfactory use on packaging machines such as the Scandia cigarette wrapper should have a maximum MST of about 225° F.

Ultimate Seal strength (U.S.S.)

The U.S.S. is the highest seal strength attainable under practical heat sealing conditions. For the purpose of comparison, a sealing temperature of 270° F. is used. U.S.S. of at least about 225 grams/inch are required for satisfactory operation on packaging machines.

Humidity Resistance of Seals

In order to determine the resistance of heat seals to high humidity conditions, seals made at 270° F. are hung in a controlled humidity cabinet at 90% R.H. and 100° F. for 24 hours. They are pulled immediately upon removal from the cabinet and the values obtained are compared with values obtained on seal strips maintained at 50% R.H. and 75° F.

Blocking Resistance

Blocking is measured by placing films (face to face) in a laboratory press closely maintained at 140° F. with a pressure of 750 psi. for 1 hour. The force required to separate the films is determined as described above. Practical experience has shown that a value of less than 5 grams/inch is required for satisfactory life under typical shipping and storage conditions.

Hot Slip

Hot slip is a measure of the coefficient of friction of the coated film in contact with a polished stainless steel surface at 270° F. This property is of great commercial importance as it relates to the ability of a wrapped package to move freely over a heated platen in typical packaging machines. It also serves as a measure of ease of separation from crimp seal jaws in form-and-fill packaging machines. Values of less than about 0.75 are required for satisfactory operation.

DISCUSSION OF EXAMPLES

Examination of the data presented in Table I illustrates the essential features of this invention. Example I, containing no rosin derivative, loses almost all of its heat seal strength when the sealed strip is exposed to 90% relative humidity.

In Examples 2-7, increasing proportions of the acrylic resin were replaced by the rosin derivative. It is shown that as little as 4% replacement improves the seal strength retention at 90% R.H. Large amounts of substitution (greater than about 12%) as shown in Examples 6-7 results in unusually high minimum seal temperatures.

Examples 8-12 show the effect of omitting colloidal silica from the formulation. Hot slip values are excessively high and the films could not be used in packaging applications where the film must slide freely over a heated metal surface such as a sealing platen. Also, films of this type would not release freely from a heated metal crimp seal jaw.

Finally, Example 13 shows the importance of wax in preventing blocking of film surfaces under moderately high temperatures and pressures such as might be encountered during shipping and storage of rolls of film.

In accordance with the present invention experimental work has shown that commercially useful film should have a blocking value of not more than 5 grams/inch, low pressure heat seals of at least 100 grams/inch at 230° F., a sealing temperature of at least 150 grams/inch at 250° F., and a coefficient of friction of less than 0.35. It has been found that coating compositions based on acrylic interpolymers with a glass transition temperature of less than about 100° F. are unsatisfactory in regard to at least one of these criteria. On the other hand, coatings based on acrylic multipolymers having a glass transition temperature greater than about 140° F. are unsatisfactory with respect to one of the aforenoted criteria. Accordingly, applicant has found that by varying the amounts of monomer present in the acrylic interpolymer, coatings are obtained which are within the desired glass transition temperature range. As hereinbefore discussed, the desired glass transition temperature range is obtained by employing (a) about 2.5 to about 6 parts by weight of the acid moiety; (b) from about 97.5 to about 94 parts by weight of neutral monomer esters, said neutral monomer esters comprising (1) methyl acrylate or ethyl acrylate and (2) methyl methacrylate, said interpolymer comprising from about 30% to about 55% by weight of methyl methacrylate when said alkyl acrylate is methyl acrylate, and from about 52.5% to about 69% by weight of methyl methacrylate when said alkyl acrylate is ethyl acrylate.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. A polyolefin film substrate having a surface coating of a heat sealable composition consisting of an interpolymer as the film forming agent of (a) from about 2.5 to about 6 parts by weight of an $\alpha$-$\beta$ monoethylenically unsaturated carboxylic acid selected from the group consisting of acrylic acid, methacrylic acid, and mixtures thereof, and (b) from about 97.5 to about 94 parts by weight of neutral monomer esters, said neutral monomer esters comprising (1) methyl acrylate or ethyl acrylate and (2) methyl methacrylate, said interpolymer comprising from about 30% to about 55% by weight of methyl methacrylate when said alkyl acrylate is methyl acrylate, and from about 52.5% to about 69% by weight of methyl methacrylate when said alkyl acrylate is ethyl acrylate; said interpolymer coating being further characterized as containing (1) from about 30% to about 60% by weight based upon the total weight of said interpolymer, of a hot slip agent consisting of a finely-divided, water-insoluble, inorganic solid selected from the group consisting of silica, diatomaceous earth, calcium silicate, bentonite and finely-divided clays, said inorganic solid having a particle size between about 10 and about 200 millimicrons, and (2) said interpolymer coating being further characterized by containing a cold-slip, anti-blocking material comprising finely-divided wax, (3) said coating additionally containing from about 3 to about 15% by weight based on the weight of the acrylic terpolymer coating component of a compound selected from the group consisting of an adduct of rosin and an alpha-beta unsaturated dicarboxylic acid and the partial esters of said adduct and polyhydric alcohol.

2. A coated substrate, as defined in claim 1, in which the substrate is polypropylene.

3. A polyolefin film substrate having a surface coating of a heat sealable composition consisting of an interpolymer as the film forming agent of (a) from about 2.5 to about 6 parts by weight of an alpha-beta monoethylenically unsaturated carboxylic acid selected from the group consisting of acrylic acid, methacrylic acid, and mixtures thereof, and (b) from about 97.5 to about 94 parts by weight of neutral monomer esters, said neutral monomer esters comprising (1) methyl acrylate or ethyl acrylate and (2) methyl methacrylate, said interpolymer comprising from about 30% to about 55% by weight of methyl methacrylate when said alkyl acrylate is methyl acrylate, and from about 52.5% to about 69% by weight of methyl methacrylate when said alkyl acrylate is ethyl acrylate; said interpolymer coating being further characterized as containing (1) from about 30% to about 60% by weight based upon the total weight of said interpolymer, of a hot slip agent consisting of a finely-divided, water-insoluble, inorganic solid selected from the group consisting of silica, diatomaceous earth, calcium silicate, bentonite and finely-divided clays, said inorganic solid having a particle size between about 10 and about 200 millimicrons, and (2) said interpolymer coating being further characterized by containing a cold-slip, anti-blocking material comprising finely-divided wax, (3) said coating additionally containing from about 4 to about 10% by weight based on the weight of the acrylic terpolymer coating component of a compound selected from the group consisting of an adduct of rosin and an alpha-beta unsaturated dicarboxylic acid and the partial esters of said adduct and polyhydric alcohol.

4. A polyolefin film substrate having a surface coating of a heat sealable composition consisting of an interpolymer as the film forming agent of (a) from about 2.5 to about 6 parts by weight of an alpha-beta monoethylenically unsaturated carboxylic acid selected from the group consisting of acrylic acid, methacrylic acid, and mixtures thereof, and (b) from about 97.5 to about 94 parts by weight of neutral monomer esters, said neutral monomer esters comprising (1) methyl acrylate or ethyl acrylate and (2) methyl methacrylate, said interpolymer comprising from about 30% to about 55% by weight of methyl methacrylate when said alkyl acrylate is methyl acrylate, and from about 52.5% to about 69% by weight of methyl methacrylate when said alkyl acrylate is ethyl acrylate; said interpolymer coating being further characterized as containing (1) from about 30% to about 60% by weight based upon the total weight of said interpolymer, of a hot slip agent consisting of a finely-divided, water-insoluble, inorganic solid selected from the group consisting of silica, diatomaceous earth, calcium silicate, bentonite and finely-divided clays, said inorganic solid having a particle size between about 10 and about 200 millimicrons, and (2) said interpolymer coating being further characterized by containing a cold-slip, anti-blocking material comprising finely-divided wax, (3) said coating additionally containing from about 4 to about 10% by weight based on the weight of the acrylic terpolymer coating component of a compound selected from the group consisting of an adduct of rosin and an alpha-beta unsaturated dicarboxylic acid and the partial esters of said adduct and polyhydric alcohol; said coated film substrate, when heat sealed and exposed to ambient conditions of high relative humidity of at least about 90%, retains at least about 90% of the original heat seal strength.

5. A polyolefin film substrate having a surface coating of a heat sealable composition consisting of an interpolymer as the film forming agent of (a) from about 2.5 to about 6 parts by weight of an alpha-beta monoethylenically unsaturated carboxylic acid selected from the group consisting of acrylic acid, methacrylic acid, and mixtures thereof, and (b) from about 97.5 to about 94 parts by weight of neutral monomer esters, said neutral monomer esters comprising (1) methyl acrylate or ethyl acrylate and (2) methyl methacrylate, and interpolymer comprising from about 30% to about 55% by weight of methyl methacrylate when said alkyl acrylate is methyl acrylate, and from about 52.5% to about 69% by weight of methyl methacrylate when said alkyl acrylate is ethyl acrylate; said interpolymer coating being further characterized as containing (1) from about 30% to about 60% by weight based upon the total weight of said interpolymer, of a hot-slip agent consisting of a finely-divided, water-insoluble, inorganic solid selected from the group consisting of silica, diatomaceous earth, calcium silicate, bentonite and finely-divided clays, said inorganic solid having a particle size between about 10 and about 200 millimicrons, and (2) said interpolymer coating being further characterized by containing a cold-slip, anti-blocking material comprising finely-divided wax, (3) said coating additionally containing from about 4 to about 10% by weight based on the weight of the acrylic terpolymer coating component of a compound selected from the group consisting of an adduct of rosin and an alpha-beta unsaturated dicarboxylic acid and the partial esters of said adduct and polyhydric alcohol; said coated film substrate, when heat sealed and exposed to ambient conditions of high relative humidity of at least about 90%, retains a heat seal strength of at least about 225 grams per inch.

* * * * *